United States Patent [19]

Häussler

[11] 4,381,699
[45] May 3, 1983

[54] HYDRAULIC CONTROL SYSTEM

[75] Inventor: Hubert Häussler, Neuheim/Zug, Switzerland

[73] Assignee: Barmag Barmer Maschinenfabrik AG, Remscheid-Lennep, Fed. Rep. of Germany

[21] Appl. No.: 132,151

[22] Filed: Mar. 20, 1980

Related U.S. Application Data

[62] Division of Ser. No. 864,652, Dec. 27, 1977, Pat. No. 4,205,592.

[30] Foreign Application Priority Data

Dec. 24, 1976 [DE] Fed. Rep. of Germany ....... 2658928

[51] Int. Cl.³ .......................................... F15B 13/044
[52] U.S. Cl. ............................. 91/433; 91/459; 137/487.5; 137/625.65
[58] Field of Search ............... 91/433, 459; 137/487.5, 137/486, 625.65; 73/861.53, 861.58

[56] References Cited

U.S. PATENT DOCUMENTS

| | | | |
|---|---|---|---|
| 3,038,498 | 6/1962 | Seavey | 91/433 X |
| 3,287,971 | 11/1966 | Bahniuk | 73/861.58 |
| 3,623,046 | 11/1971 | Scourtes | 73/861.53 |
| 3,732,887 | 5/1973 | Hayner | 137/486 |
| 3,953,819 | 4/1976 | Keerie et al. | 73/861.76 X |
| 4,061,155 | 12/1977 | Sopha | 91/433 X |

Primary Examiner—Gerald A. Michalsky
Attorney, Agent, or Firm—John H. Shurtleff

[57] ABSTRACT

A hydraulic control system for use in machine tools, construction machines, hoists and the like, with a driven unit the hydraulic circuit of which is controlled by one or more electromagnetically positioned slide valves, and with an arrangement for automatically regulating the velocity of the hydraulic drive unit regardless of fluctuations in the pressure of the oil supply and similar disturbances. The regulating arrangement includes a potentiometer mechanically controlled by a flow meter interposed in the hydraulic circuit; and an electric comparator the inputs of which are connected to the potentiometer and to a desired-flow-value selector, respectively, and the output of which controls the valve electromagnet(s). In this manner the difference signal developed by the comparator is used to change the setting of the valve in a correcting sense. Several implementations for this regulating circuit and for the design of the flow meter and the valves are disclosed.

7 Claims, 14 Drawing Figures

HYDRAULIC CONTROL SYSTEM

This is a division, of application Ser. No. 864,652 filed Dec. 27, 1977, now U.S. Pat. No. 4,205,592.

The invention relates to hydraulic control systems of the type in which a hydraulic drive unit is connected to a hydraulic circuit through which hydraulic fluid flows under the control of flow-control valve means operated by electric valve-positioning means. More specifically, the invention addresses itself to a regulating arrangement for maintaining the velocity of movement of the hydraulic drive unit substantially constant regardless of disturbances including fluctuations in the pressure of the pressure fluid supply.

The hydraulic drive unit, hereinafter also referred to as the hydraulic "user" may be any kind of hydraulic driving device or hydraulic motor, including particularly a hydraulic cylinder-piston unit; and the invention may be employed in a great many applications such as, for example, machine tools, construction machines and hoisting systems.

Regulating arrangements for hydraulic control systems of the type mentioned above are known in which the main piston of the flow control valve is operable by an electric positioning member which is connected, by way of a comparing means, on the one hand to an electric displacement measuring means and, on the other hand, to an adjustable desired-value sender means. Reference in this connection is made to German published patent application (DTOS) No. 2,131,517 showing a hydraulic control in which a displacement-measuring means is interposed between the valve housing and the electromagnet operating the valve. This displacement-measuring means transmits to the regulating circuit a signal which is proportional to the displacement of the control piston.

This known arrangement has the disadvantage that it is responsive only to the displacement of the control piston and hence only to one parameter of the regulating circuit; whereas no allowance whatever is made for the remaining parameters such as, for example, load pressure, pump pressure, etc. Therefore, the range of applications in which this regulating circuit can be used is limited.

A further known regulating arrangement for hydraulic driving devices, shown in DTOS No. 2,235,788, takes the oil supply to the "user" into account. The regulating arrangement shown there has the drawback that it is subject to contamination so that careful filtering of the oil supply is required. Another disadvantage is that this regulating arrangement employs a hydraulic-mechanical force comparison. Thus, the roll played by the friction in the hydraulic elements can no longer be neglected. In addition, the regulating arrangement is rendered viscosity-dependent in this manner. This known regulating circuit is much better adapted to practical requirements; however, from an equipment standpoint, its costs are considerable and as a result, the range of its applications is limited.

It is accordingly the principal object of the invention to provide a regulating arrangement for a hydraulic control system, which takes account of, and compensates for, all the disturbance variables within the system without increasing the equipment costs.

In the regulating arrangement according to the invention this object is met, briefly, by including the flow meter in the hydraulic circuit; by connecting electric displacement-measuring means to the flow meter so as to detect the displacement amplitude of the flow meter and convert this amplitude into an electric actual-valve signal; by electrically connecting electric comparing means on the input side, on the one hand, to the electric displacement-measuring means and, on the other hand, to the electric desired-value sending means, and by electrically connecting the comparing means on the output side to the electric value-positioning means so that the actual-valve signal is compared in the comparing means with the desired-value signal and the resultant difference signal impressed on the electric valve-positioning means for changing the setting of the valve means in a correcting sense.

The advantage of the invention lies in that it provides with simple means and a minimum of structural elements a complete regulating arrangement which is adaptable to any given situation. Due to the monitoring of the fluid flow, the regulating circuit responds, virtually without delay to all disturbance variables since all potentially occurring disturbance variables are immediately reflected by a change in the fluid flow and since the latter is monitored at all times.

Various preferred embodiments of the invention have been disclosed herein which exhibit a number of advantageous features. As shown by these embodiments, the valve means can be connected either in series with the hydraulic circuit, or they can be connected in by-pass thereto, namely at a point between the supply means and the flow meter. In either case the flow meter can simply be of the unidirectional type and the valve means may simply include a 2/2 valve, that is a valve having two ports of fluid connections and having two end positions in one of which the valve is fully closed and in the other of which it is fully open.

According to an alternative embodiment, the hydraulic drive unit is operatively connected to a unilaterally acting load, as it is in the case of a lift control system, for example; the flow meter is of bi-directional design and is interposed in the driving leg of the hydraulic circuit and the electric displacement-measuring means and the electric desired-value sending means are of bi-polar design. In this embodiment the valve means is preferably provided with two valve positioning members for positioning the valve means to control the two opposite directions of fluid flow, respectively; and diode means are interposed in the output connection of the comparing means to the two valve positioning members to electrically isolate the last-mentioned two means from each other. This alternative embodiment thus serves two directions of motion; yet, only a single flow meter is needed although each direction of motion can independently and individually be regulated by separate desired-value adjustments.

Two implementations for this alternative technique have been disclosed: In the one, the valve means is in the form of a 3/3 valve, that is, a valve having three ports and having, in addition to a central or blocking position, two end positions, one on either side of the central position. This has the advantage that the flow meter can be used for both directions of motion of the drive unit so that the regulating equipment costs are minimized. In the other implementation, the valve means comprise two separate 2/2 valves, the first of these valves being connected in series with the hydraulic circuit, between the flow meter and the system reservoir, and the second being connected in by-pass to the hydraulic circuit at a point intermediate the supply source and the flow meter; and a check valve is interposed between this point and the juncture between the flow meter and the first valve.

In yet another embodiment of the regulating arrangement according to the invention, the hydraulic circuit has two legs for driving the drive unit in opposite directions, respectively, with the guide unit having two ports respectively connected to these two driving legs; and the valve means is in the form of a single 4/3 valve. This valve has two pairs of ports, a central position and two end positions, one on each side of the central position, for reversing the interconnections of the ports of the two pairs; the valve is provided with two positioning members for positioning the valve in the direction of the two end positions, respectively.

Here again, a number of preferred implementations have been disclosed: In one, the flow meter is of unidirectional design; the electric displacement-measuring means and the electric desired-valve sending means are of unipolar design; and separate switching elements are provided for isolating the two positioning members from each other with respect to the output of the electric comparing means. Thus, notwithstanding the unidirectional design of the flow meter and the unipolar design of the two value-selecting means, the velocity of the drive unit is regulated in both directions, independently of the direction in which the load acts. In two other implementations the electric displacement-measuring means and the electric desired-value sending means are of bi-polar design; and diode means are interposed in the output connections of the comparing means to the two valve positioning members to electrically isolate the two members from each other.

In the first of these two other implementations the hydraulic drive unit is operatively connected to a unidirectionally acting load; and the flow meter is of bi-directional design and is interposed in that leg of the hydraulic circuit in which it supports the load. This version lends itself well for use in connection with the feed movement in machine tools, such as shaping machines, and also for use in various construction machines and cranes.

In the second of the last-mentioned two implementations the flow meter is of a three-port direction-selecting design and is interposed in the hydraulic circuit between the valve and the system reservoir. Due to the two measuring ranges afforded by the direction-selecting flow meter, the velocities of the drive unit in both directions of motion can be required independently of each other.

Further preferred features of the invention relate to the physical design of the flow meter and of the displacement-measuring means and the valve means. As to the flow meter and the displacement-measuring means, particular attention has been paid to minimum response time and high accuracy in operation. The flow meter is designed so that it operates virtually without a dead zone. However, if a predetermined dead zone is desired, a corresponding covering of the inflow and outflow openings is required as described in more detail hereinafter.

In the regulating arrangement according to the invention the flow meter preferably has a sensor fixedly attached to a guide rod which is movable in the flow meter housing axially and against the action of a biased spring; and the electric displacement-measuring means includes a potentiometer having a slider mounted on the guide rod, this potentiometer being located in the pressure fluid space of the flow meter. Biasing of the springs in the flow meter makes it possible to shift the operating range of the measuring means into the range of turbulent flow so that at the measuring edge no jump occurs from laminar to turbulent flow and that the ensuing adulteration of the measuring result is avoided. In this manner, a linear output signal of the displacement-measuring means is insured. Locating the displacement-measuring means in the pressure fluid space of the flow meter has the advantage that this results in a tight, fully pressure resistant and low-friction design—since apart from the electric measuring conductors no connections have to be run out of the flow meter casing.

Again two implementations of this technique have been shown; in one of these implementations, in the normal position of the range of motion of the sensor the inner outline of the housing equals the outer outline of the sensor and increases in width in the measuring direction. In the other implementation the flow meter housing has an axially constant inner cross section; the sensor is in the form of a plate; and the fluid inlets and outlets of the housing are axially displaced with respect to each other and are disposed within the range of motion of the plate.

Also, in a preferred implementation of the direction-selecting flow meter mentioned above, the later has a housing of constant inner diameter; the sensor means of the flow meter which are axially movable in the housing, are suspended between springs and, in the rest position of the sensor means, cover a radially disposed outflow port; and two inflow ports are disposed outside of the range of movement of said sensor means, on the two sides, respectively, of said outflow ports. This flow meter has the same advantages as the flow meter initially referred to. In addition, this direction-selecting flow meter is particularly well suited for inclusion in the housing of a 4/3 control valve, as will become clear from the detailed description given hereinbelow.

In a preferred design of the valve means a valve, such as one of the 2/2 type has a main control piston of the differential type and also a pilot piston; the positioning means includes a positioning member in the form of a non-polarized electromagnet controlling the pilot piston; and the pilot piston is interposed in a hydraulic pilot line controlling the communication of that side of the differential piston which has the larger surface area, with the system reservoir, and is moved by the electromagnet to vary the outflow to the reservoir in accordance with the electric current flowing through the electromagnet. This preferred design has the advantage that it facilitates, to a large extent, the use of identical parts, such as for the series- and the by-pass type valve. In this manner, manufacture and maintenance of the valve means can be substantially simplified.

The various embodiments of the invention will now be described with reference to the accompanying drawings in which.

Figure 1:
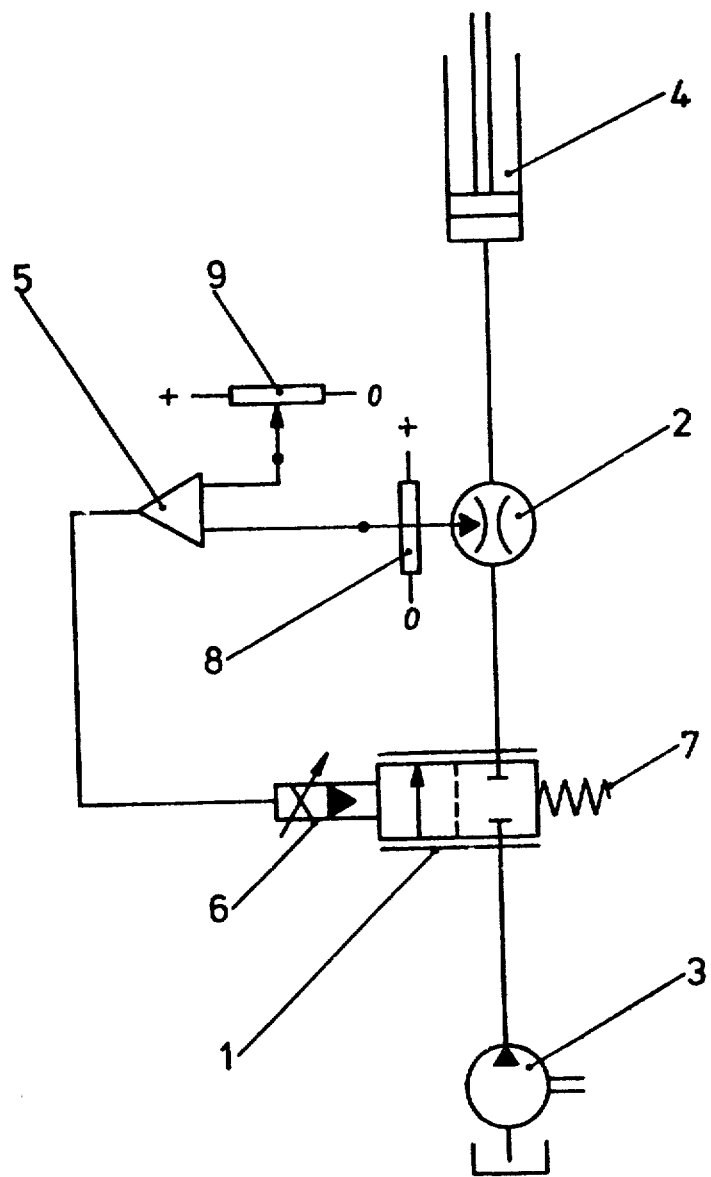
FIG. 1 shows a hydraulic regulating circuit with a 2/2 flow-control valve in series connection with a flow meter for one operating direction.
Figure 2:
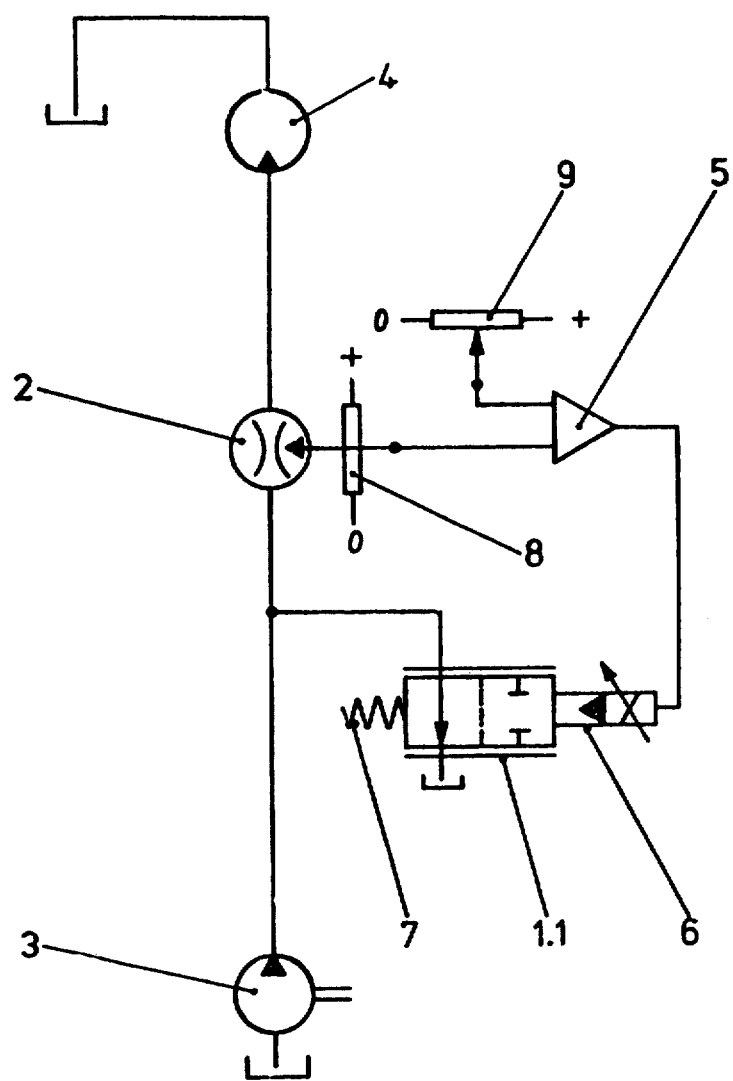
FIG. 2 shows a hydraulic regulating circuit with a 2/2 flow-control valve in the by-pass and with a flow meter for one operating direction.
Figure 4:
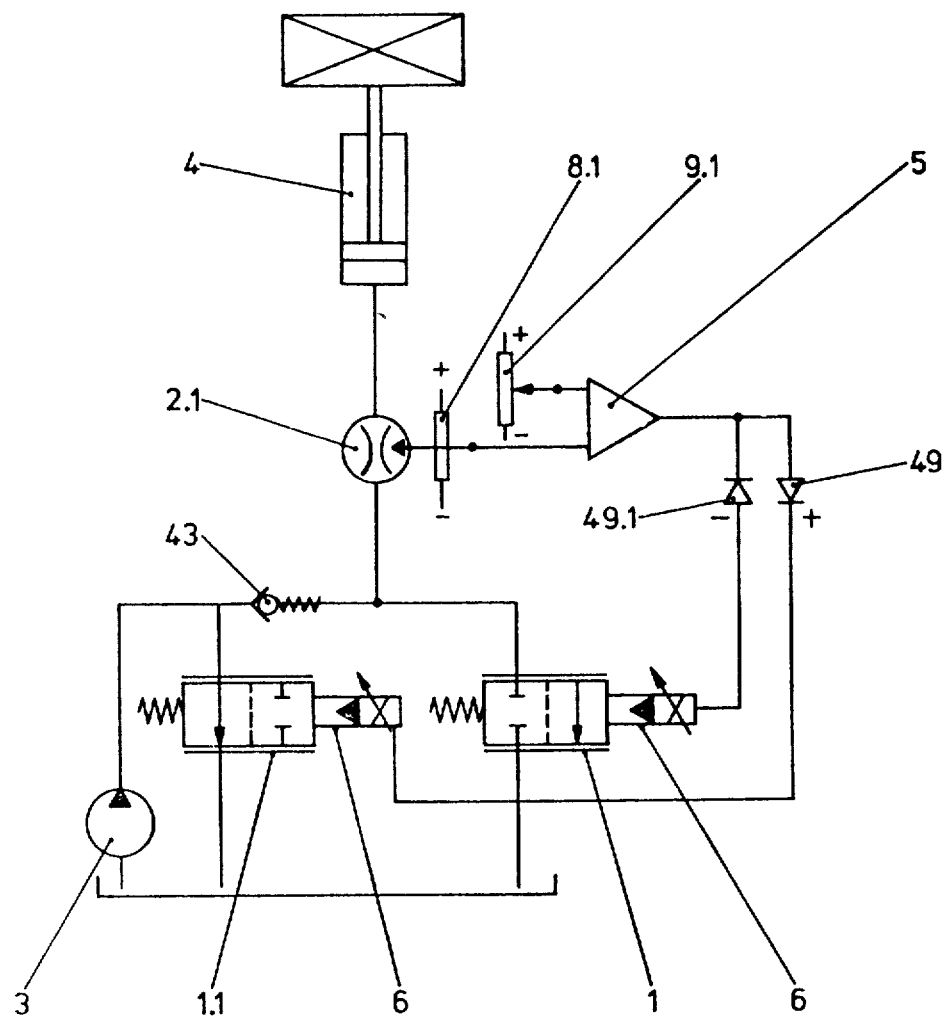
FIG. 4 shows a regulating circuit with two 2/2 flow-control valves and a flow meter for two operating directions.
Figure 4A:
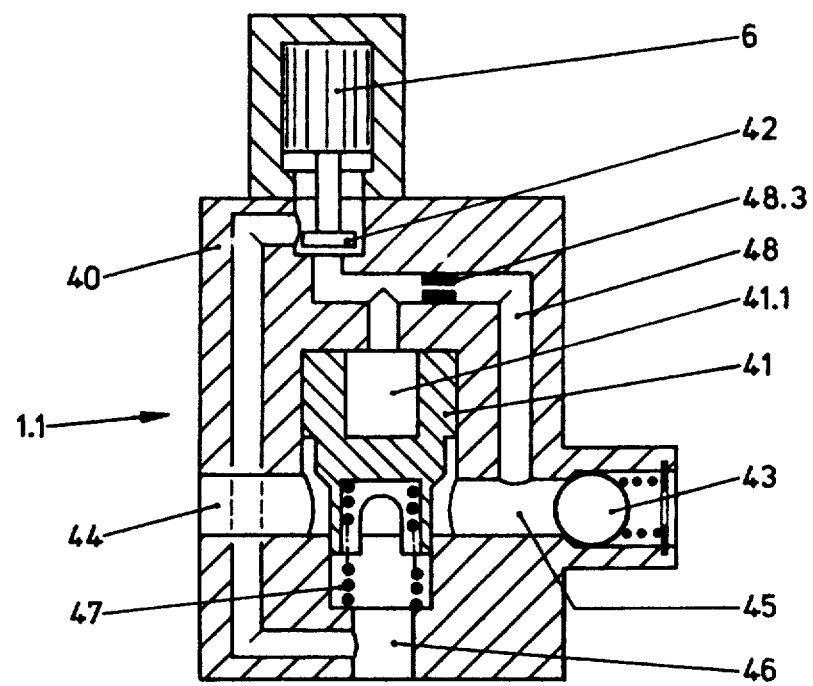
Figure 4B:
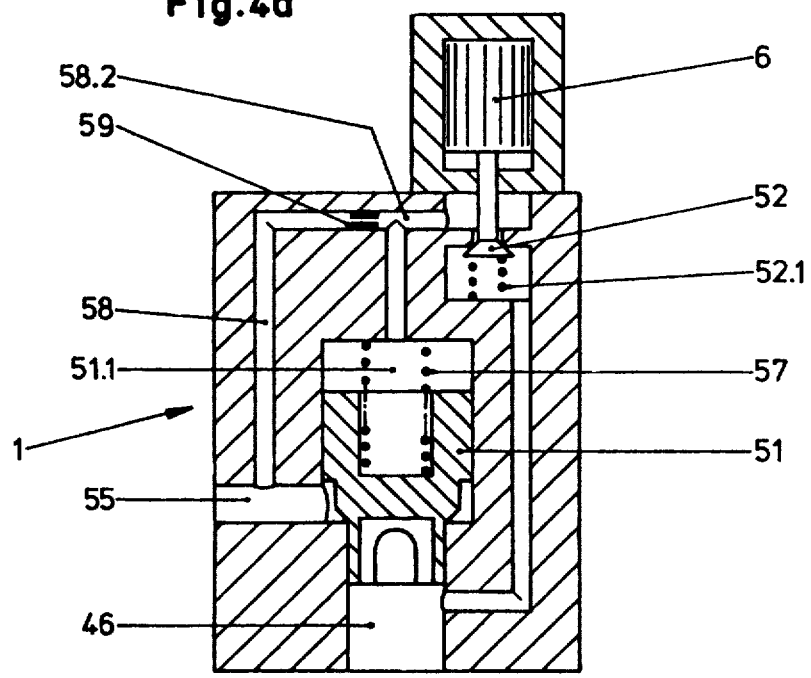
Figure 5:
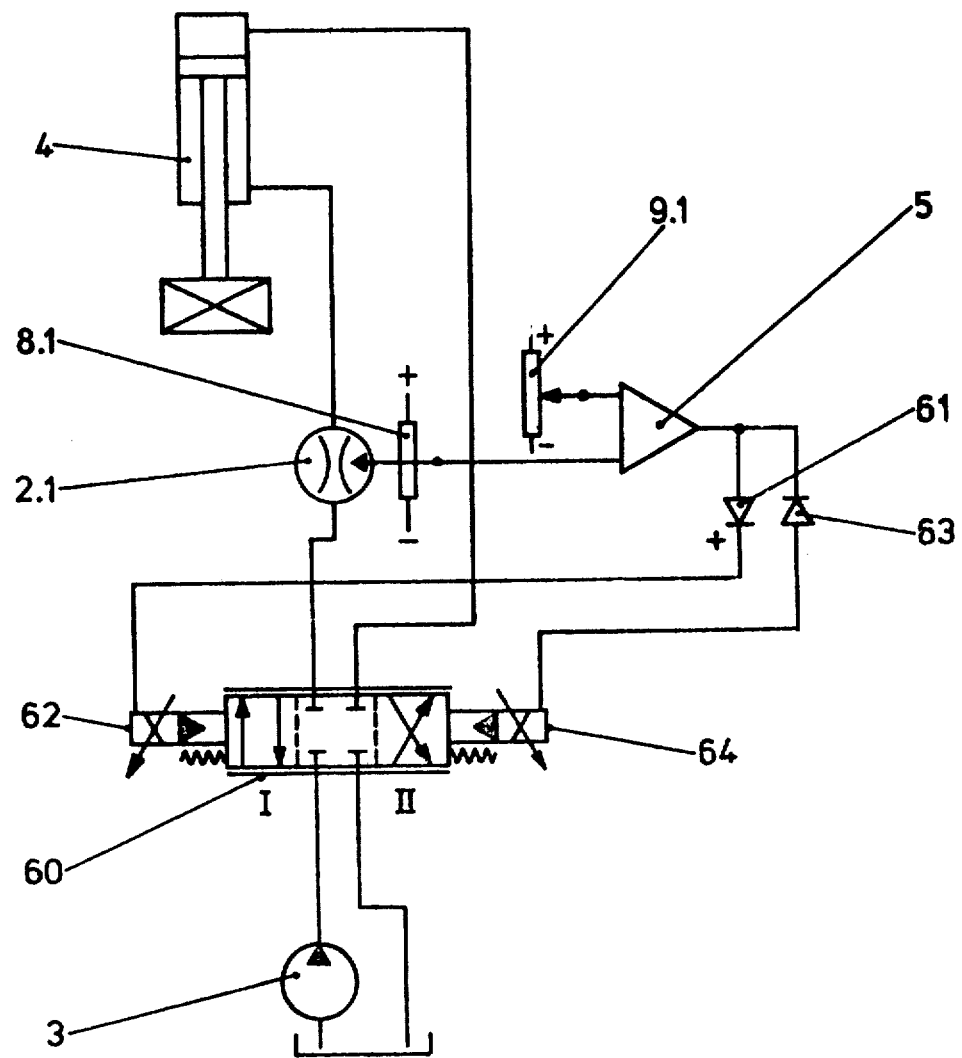
Figure 6:
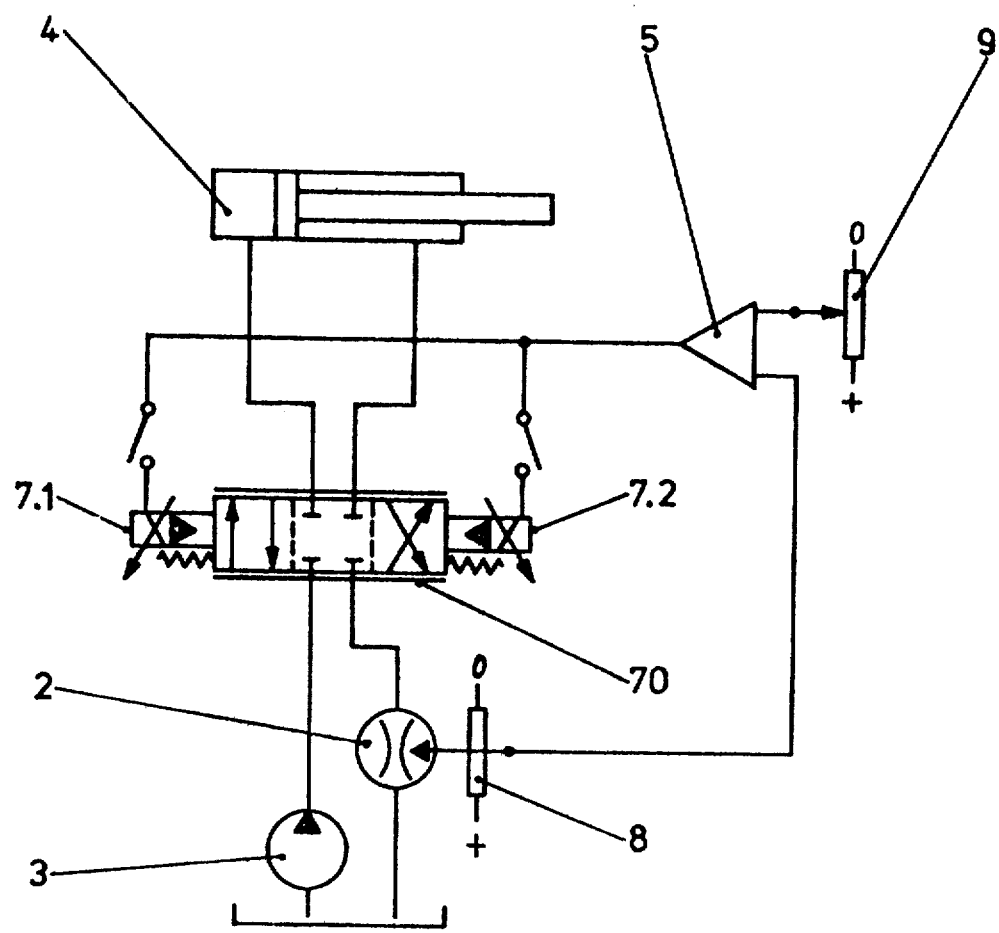
Figure 7:
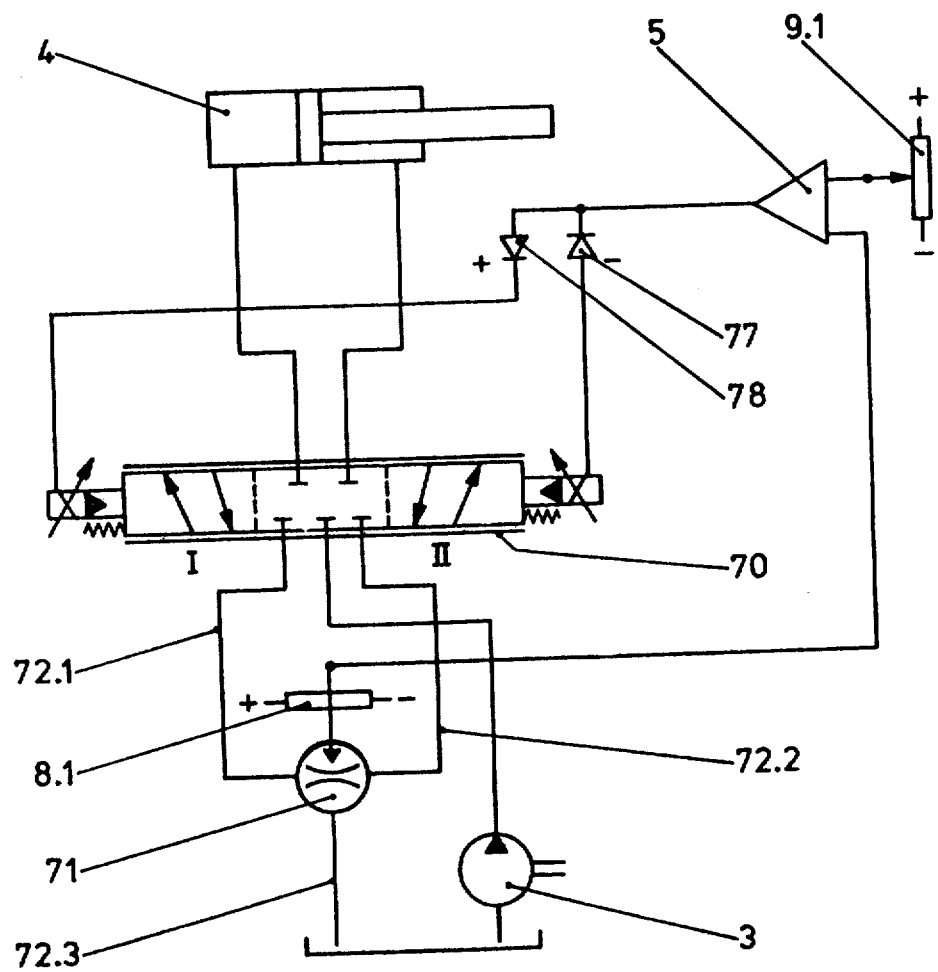
Figure 7A:
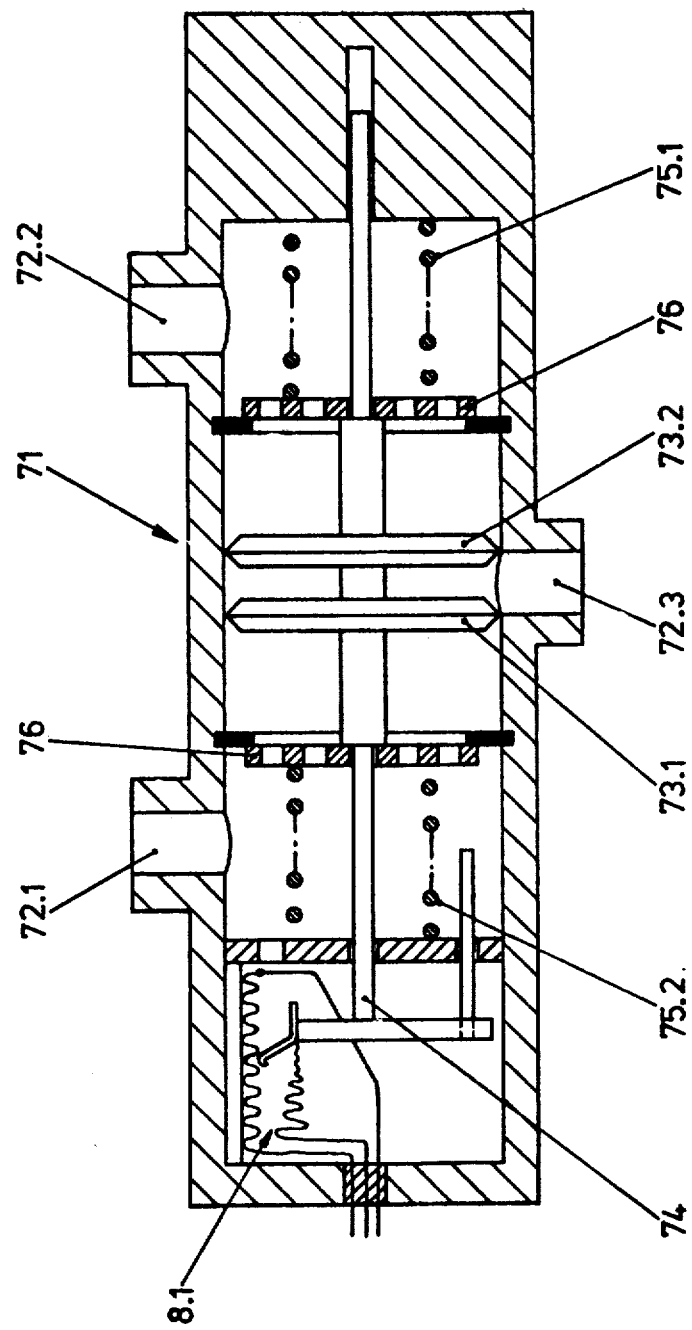
Figure 8:
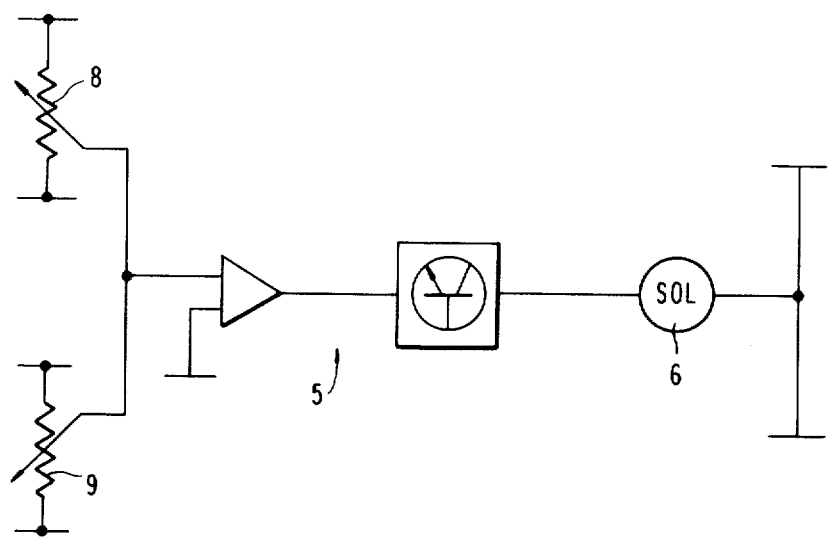

FIGS. 4a and 4b show in cross section special embodiments of the 2/2 flow-control valves for the regulating circuits according to FIGS. 1, 2 and 4;

FIG. 5 shows a regulating circuit with a 4/3 flow-control valve, in series connection with a flow meter for two operating directions;

FIG. 6 shows a regulating circuit with a 4/3 flow-control valve in series circuit with a flow meter for one operating direction;

FIG. 7 shows a regulating circuit with a 4/3 or, strictly speaking 5/3, flow-control valve in series connection with a direction-selecting flow meter;

FIG. 7a shows a flow meter suited for the regulating circuit illustrated in FIG. 7; and FIG. 8 shows the electrical circuit with the comparator/amplifier of the FIGS. 1 to 7 in more detail.

All regulating circuits shown herein have been illustrated only schematically and they show only those elements which are necessary for an understanding of the invention. The valves have been shown as continuously movable slide valves. The actuating device or user has been illustrated as a cylinder-piston unit, however any other actuating devices may be used instead.

In FIG. 1 the regulating circuit according to the invention is shown in its simplest form. It consists of a continuously displaceable 2/2 flow-control valve 1, a flow meter 2 having only one operating direction, a pressure source 3, a user 4 an amplifier/comparator 5 and a desired-valve sender 9.

2/2 flow-control valve 1 is continuously operated, against the force of a spring and of the hydraulic pressure, by an electromagnet 6 in the form of a porportional magnet. Flow meter 2 which may be integrally mounted in the housing of flow-control valve 1 has a displacement sender 8 (hereinafter called actual-valve sender) which furnishes a signal ranging from 0 to max. +, which is proportional to the existing fluid flow. The actual-value sender 8 and the desired-value sender 9 are connected to the input side of the comparator/amplifier 5. The output of the amplifier is connected to electromagnet 6. Desired-value sender 9 has the same value range as actual-value sender 8.

Figure 1A:
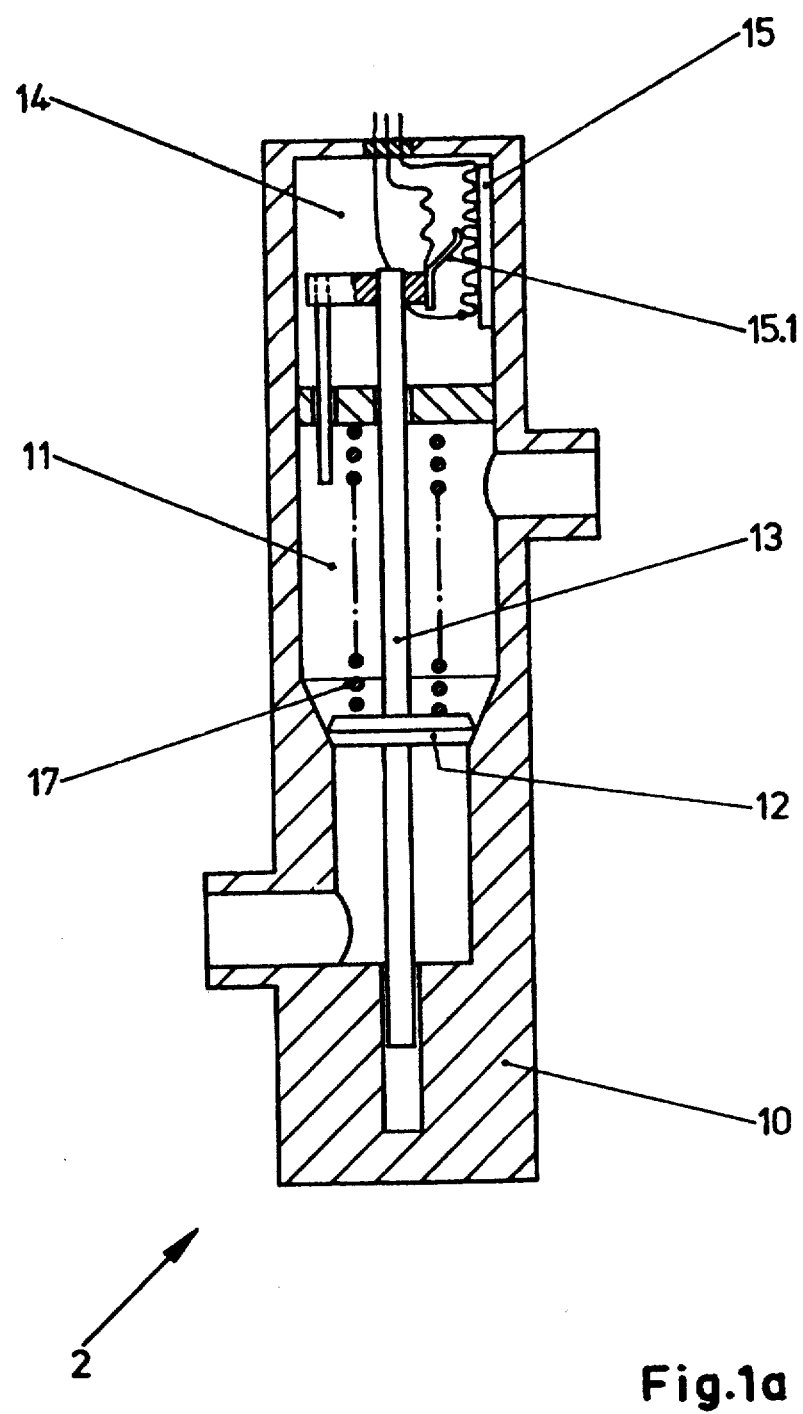
FIG. 1a shows a flow meter for the regulating circuit shown in FIG. 1.

A suitable flow meter has been illustrated in FIG. 1a. It consists of a housing 10 which has radially disposed inlet and outlet connections. The interior of the housing itself is subdivided into chambers 11 and 14 which are in communication with each other.

In pressure fluid chamber 11 there is disposed the measuring element or sensor 12 which is connected with a guide rod 13 supported at both ends and is held in its rest position by a biased spring 17. The measuring element is plate-shaped and it has a defined circumferential guide edge or rim. The cross section of the housing interior in the measuring chamber continuously increases, in flow-through direction, from the rest position of measuring element 12.

Inside the measuring chamber 14 there is mounted a linear potentiometer 15 the voltage of which is taken off by means of a slider 15.1 fixedly connected to guide rod 13.

In order to initiate operation of user 4, it is necessary to actuate valve 1. This occurs in response to a signal supplied from desired-value sender 9. Since flow meter 2 does not furnish a signal as yet, an electric signal is present at the output of comparator 5. Depending on the value of the last-mentioned signal, valve 1 is shifted against the force of spring 7. As a result, the pump supplies the pressure fluid through flow meter 2 to user 4. Measuring element 12 is lifted by the fluid current in accordance with the flow velocity of the medium and of the pressure difference produced at measuring element 12. In this manner the voltage picked off at actual-value sender 8 is varied. This voltage is compared with the set desired-value, and in the case of a departure, electromagnet 6 of value 1 is controlled in a correcting sense.

It may be helpful here to summarize the operation of the arrangement shown in FIG. 1 and the electrical circuit shown in FIG. 8 in more detail and to illustrate it by reference to a numerical example.

For starting-up the user 4 the desired-value sender 9 is given the setting desired for operation. The voltage of sender 9 which is connected to the upper input of comparator 5, FIG. 1, is passed by the comparator to electromagnet 6 to an amount corresponding to this setting—for the reason that actual-value sender 8 has no voltage output at this time. Thus, flow-control valve 1 is opened. Depending on the degree by which the valve is opened, oil is caused to flow through flow meter 2 and this in turn causes actual-value sender 8 to produce a voltage which is impressed on the lower input of comparator 5. If the voltage of sender 8 is different from that of sender 9, comparator 5 produces a voltage difference. This voltage difference may be either positive or negative. Assuming, for example, that the voltage of sender 9 is 6 volts and the voltage of sender 8 is 4 volts, then the difference voltage developed by the comparator is 6−4=2 volts (positive), and this difference in voltage is algebraically added to the voltage which, as explained, is fed by sender 9 to electromagnet 6. As a result, the flow through valve 1 is increased and hence actual-value sender 8 now produces a voltage higher than 4 volts.

If the voltage of sender 8 is substantially the same as sender 9, then comparator 5 does not show a voltage difference and, as a consequence, electromagent 6 merely receives the voltage of sender 9. The electromagnet therefore is kept in its existing condition.

If the flow-through flow meter 2 is too high, then sender 8 will deliver a higher voltage than sender 9, for example 7 volts. Also in this case, the comparator furnishes the difference which, in this instance, is a negative voltage (minus 1 volt). As a consequence, the electromagnet receives a resultant voltage of 6−1=5 volts, as a result of which the valve is moved toward its closed position.

The operating principles explained above apply similarily to the other embodiments described hereinbelow.

The desired-value sender may have only a single value to which it may be set in operation. However, it may also be arranged to be continuously varied by manual adjustment or by means of a timetable control which scans a predetermined program. It is also possible to derive the desired-value from a guide pin or the like which slides along a template and in this manner actuates electric contact-closing switches.

FIG. 2 shows a modified regulating circuit using the same elements. In this circuit, contrary to FIG. 1, the supply to user 4 is not regulated by a valve connected in series with user 4 but by means of a by-pass circuit which causes the excess quantity that is not to flow to the user to be diverted to the tank or reservoir. For this reason, flow-control valve 1.1 is switched in its rest position "0" to pressureless circulation to the reservoir. All the remaining elements are the same as those used in FIG. 1, except that in FIG. 2, as indicated by the drawing symbol used therein, the drive unit or user 4 has been assumed to be a hydraulic motor rather than a cylinder-piston unit.

In order to take user 4 into use, pump 3 is turned on and a predetermined desired-value is set. Measuring element 12 in flow meter 2 is displaced, in accordance with the velocity of the pressure medium flowing to user 4, so that actual-value sender 8 transmits a signal. Here, too, in response to the presence of a difference signal control element 6 is energized by the regulating circuit in a correcting sense, that is the outflow to the reservoir is opened or closed to a greater or lesser degree. This, of course, also includes the case where the entire pressure-fluid current flows to the reservoir through valve 1.1. In this event no actual-value is produced so that a difference signal corresponding to the chosen desired-value is generated in the user whereby the control element of valve 1.1 is also controlled.

The desired-value sender of FIG. 2 may be designed in the same way as that described for FIG. 1.

Figure 3:
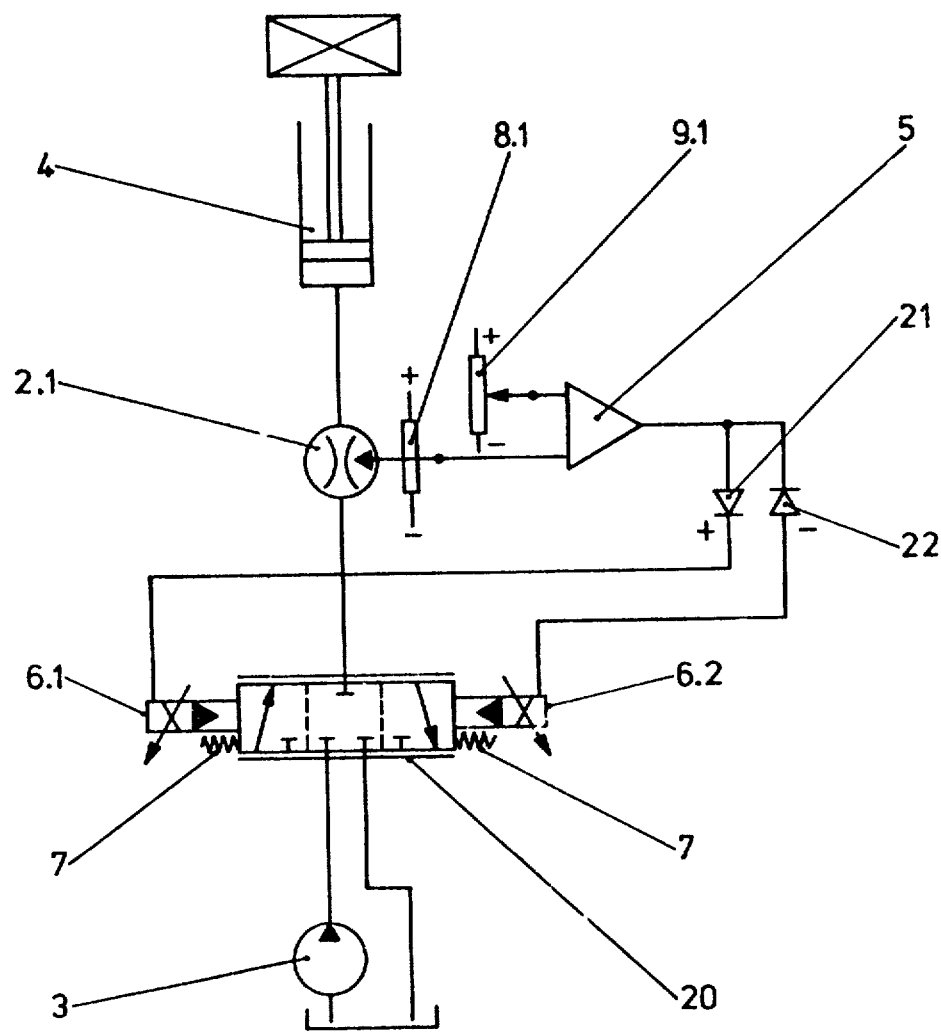
FIG. 3 shows a regulating circuit with a 3/3 flow-control valve in series connection with a flow meter for two operating directions.

FIG. 3 shows a hydraulic regulating circuit using a 3/3 flow-control valve 20. This valve is held by the two springs 7 in in its center position, that is, in its blocking position. This regulating circuit may be used with particular advantage where an external force acts on the user, that is, where the user is automatically returned to its initial position by the external force.

The flow meter used in this case differs from the flow meter for FIGS. 1 and 2 in that it is suited for both directions of flow.

Figure 3A:
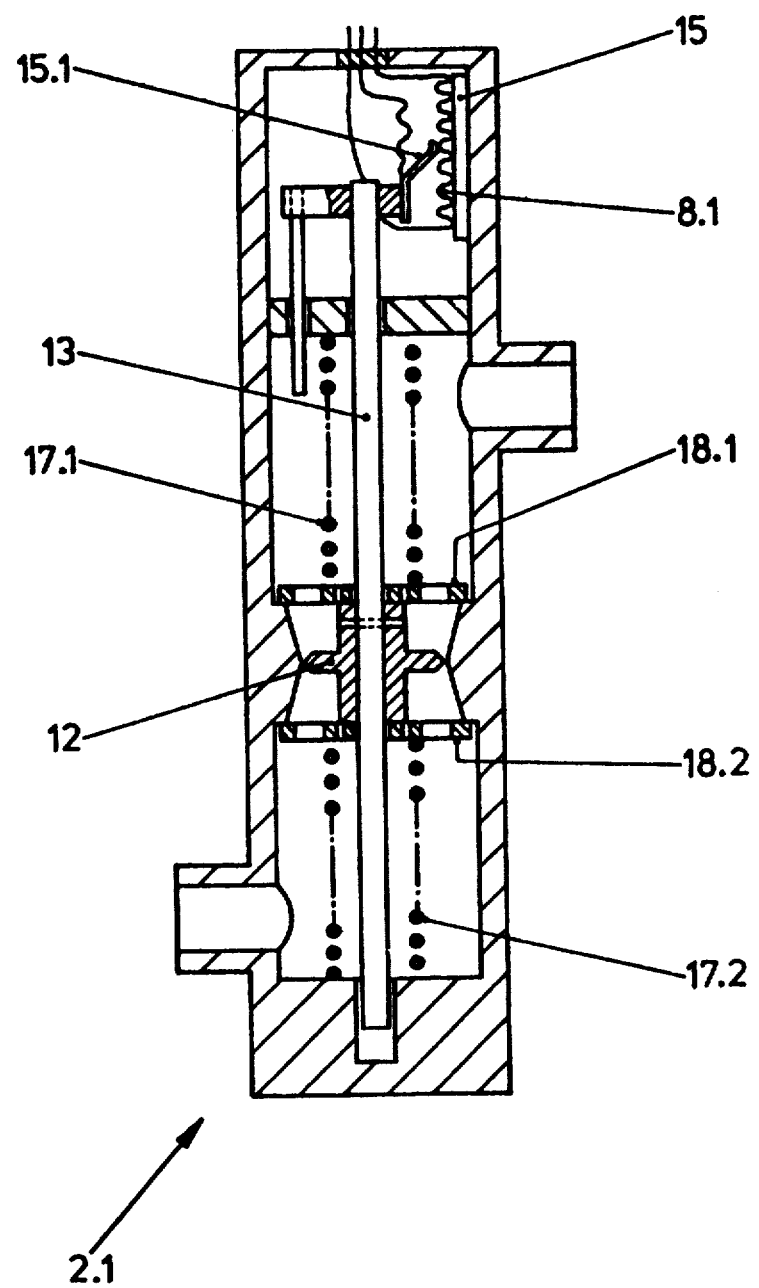
FIG. 3a shows a flow meter suited for the regulating circuit shown in FIG. 3.

In FIG. 3a such a flow meter 2.1 has been shown. Contrary to flow meter 2 illustrated in FIG. 1a, which is designed for only a single direction of flow-through, measuring element 12 is connected with guide rod 13 for axial movement in both directions. As a consequence, the cross section of the flow between measuring element 12 and the inner wall of the housing increases from the rest position of the measuring element 12 in both directions.

In order to obtain a measuring signal which is proportional in both directions of flow-through, measuring element 12 is accordingly suspended in its rest position between two biased springs 17.1 and 17.2. Springs 17.1 and 17.2 brace themselves against orifice plates 18.1 and 18.2 in such a manner that measuring element 12 upon displacement from its rest position is moved against the respective one of the biased springs. Because of the orifice plate, the other spring remains in its initial position.

The biasing of the springs has the advantage that the linear characteristic range of the spring during the measurement and hence also the linear characteristic range of the flow meter in the measuring range is not exceeded so that the measuring result needs not to be expected to be adulterated due to this cause.

By way of elaboration, there exist two different modes of flow in hydraulic connections, valves, etc.: laminar flow and turbulent flow (eddy motion). A laminar flow occurs with low flow velocity, low flow resistances and low frictional resistances and low frictional incluences within the connections, valves, etc. When increasing the flow resistance or friction and/or the flow velocity, the flow changes to eddy motion. When changing from laminar to eddy motion, flutter of the disk 12 may occur. This may give rise to an indicating error. In order to avoid this, the flow meters disclosed herein are built in such a way that an eddy motion is always produced. Under these circumstances, the flow meter is only functioning in the same mode and hence indicating errors are minimized.

Because of the enlarged measuring range of flow meter 2.1, the measuring range of actual-valve sender 8.1 has also been enlarged by designing the slider 15.1 of linear potentiometer 15 so that it, too, can be displaced from its rest position in both directions. Desired value-sender 9.1 has the same value range.

The two opposite displacement directions of valve 20 require that in the regulating circuit control elements 6.1 and 6.2 be isolated with respect to each other. This is accomplished by diodes 21,22. In order to insure that in each case the proper diode is blocked actual-valve sender 8.1 and desired-value sender 9.1 are designed so that in the event of flow-through to user 4 a positive voltage is generated so that control element 6.1 of flow-control valve 20 opens the flow-through cross section against the action of spring 7.

If the direction of flow-through changes, a negative output voltage appears at comparator/amplifier 5 so that upon departure of the actual-value signal from the desired-value signal the other diode 22 conducts and hence control element 6.2 opens or closes the out-flow to the reservoir in a correcting sense.

Figure 3B:
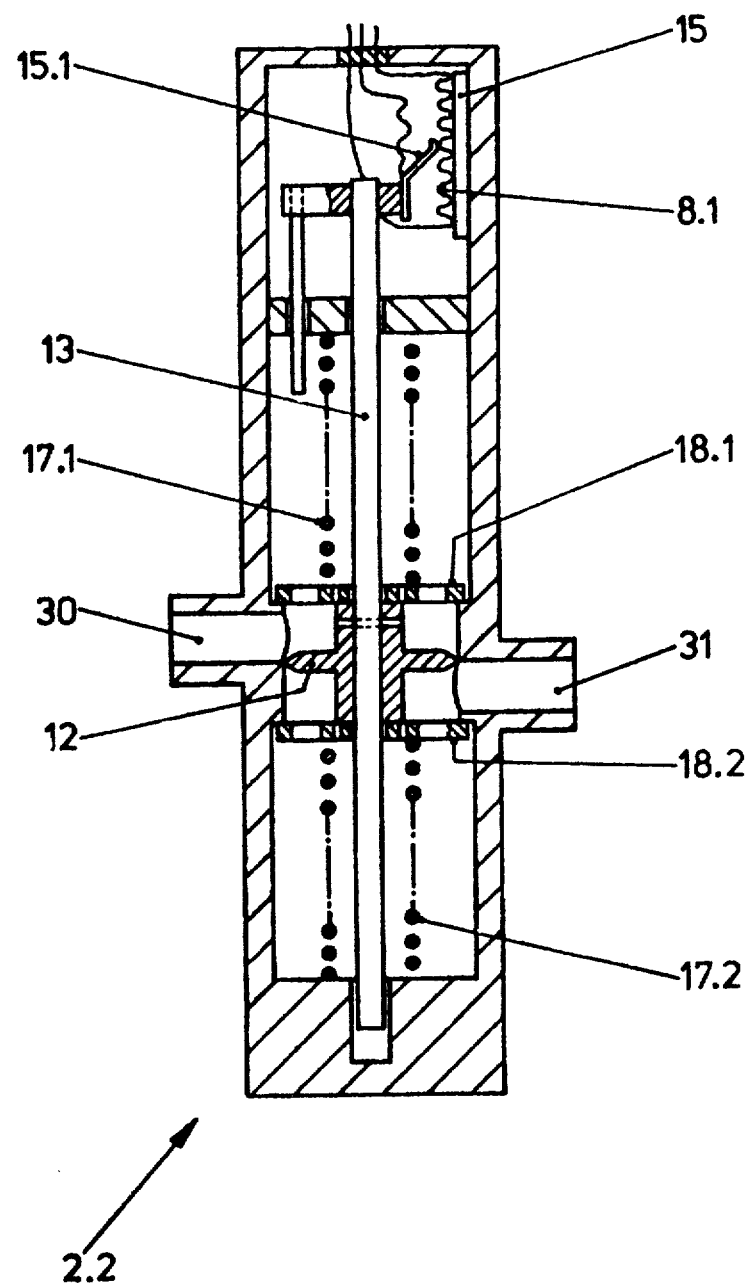
FIG. 3b shows a different embodiment of the flow meter design.

FIG. 3b a different embodiment of a flow-through meter has been shown. Flow-through meter 2.2 has two axially offset radial apertures 30 and 31. The cross section of these apertures depends on the desired indicating characteristic of the flow meter. Here, also, two springs 17.1 and 17.2 are provided which respectively bear against orifice plates 18.1 and 18.2 on the one hand, and against the inner wall of the housing on the other hand.

The orifice plates are disposed in the housing in such a way that they maintain a predetermined desired bias of the springs. The measuring element 12 of the flow meter, the arrangement of guide rod 13 and the arrangement and design of the actual-value sender 8.1 are identical with the corresponding elements of flow meter 2.1 in FIG. 3a and they have, therefore, been designated by the same reference numerals.

The operation of the flow meter is the following: If pressure fluid enters flow meter 2.1 through aperture 30, for example, measuring element 12 and, by the latter, orifice plate 18.2 and spring 17.2 are displaced downwardly. Spring 17.1 is held in its illustrated position by orifice plate 18.1. Due to the downward displacement of measuring element 12 a cross section of aperture 31 is made effective such that the fluid under pressure may flow off. Simultaneously, slider 15.1 is moved over resistor 15 of actual-value sender 18.1 so that a signal is produced. An analagous operation takes place upon in-flow of the medium under pressure through opening 31 whereby the measuring element is displaced against the force of spring 17.1. The fluid under pressure then flows off through aperture 30.

This flow meter 2.2 exhibits the same advantages and areas of application as flow meter 2.1 and thus can fully replace it.

It may be helpful to illustrate at this point the significance of the "dead zone" by reference to FIG. 3b. In the flow meter shown in this figure only a small amount of oil is required to move disk 12 and thereby open the flow-off connection. The flow meter as shown in FIG. 3b therefore functions without a dead zone, and this applies to FIGS. 1a and 3a as well.

If the flow meter, FIG. 3b, is to be operated with a dead zone, then the axial distance between ports 30 and 31 is made larger. If now a small quantity of oil is introduced into the flow meter, the measuring element 12 will also be moved but the connection between the two ports will not be opened as yet. To bring this about, a larger amount of oil will be required. If the flow meter is so modified, then actual-value sender 8.1 has to be correspondingly designed, that is, so that it does not produce a voltage in the range of the dead zone.

Because of the controlled inflow to the user and the controlled outflow from the user to the reservoir in response to an external force, the regulating circuit shown in FIG. 3 may easily be used, in modified form, for the control of a hydraulically operating lift. The circuit required for this purpose is shown in simplified form in FIG. 4. The circuit consists of the flow meter 2.1, with actual-value sender 8.1 and desired-value sender 9.1, the by-pass type outflow regulation by means of a 2/2 flow-control valve 1.1, as earlier described in connection with FIG. 2, and the regulating circuit illustrated in FIG. 1. As a safeguard against reverse current, a check valve 43 has been provided in the pump line.

Suitable switching valves in connection with which the operation of these regulating circuits shall also be explained, will now be described in detail.

FIG. 4a shows a 2/2 flow-control valve as may be used in the by-pass of FIG. 4 or FIG. 2. The valve housing 40 of valve 1.1 accommodates the main control piston 41 which is in the form of a differential piston, and the auxiliary control, or pilot, piston 42 which is actuated by electromagnet 6 and in its rest position holds the through-flow to the reservoir open. In pilot line 48 which leads to pilot piston 42 there is interposed a throttle 48.3. Check valve 43 is mounted in a flange of the valve housing. The pump connection or port is here designated as 44, the user connection or port as 45 and the reservoir connection or port as 46.

Main piston 41 is held in its opening position due to the action of spring 47. In order to insure a nearly pressureless circulation, the lower guide portion of piston 41 is formed with a plurality of gate-like apertures.

In FIG. 4b a 2/2 flow-control valve has been shown for series connection between user 4 and reservoir. It may also be used for the 2/2 flow-control valve of FIG. 1. This valve 1 also consists of a piston 51 which in this example is identical with the piston in FIG. 4A. Piston 51 is held in its closing position by spring 57. The user connection or port 55 is thereby separated from reservoir connection or port 46. Here, too, there is provided a pilot piston 52 in the inlet line of which there is also interposed a throttle 59; pilot piston 52 is actuated by electromagnet 6 and in its rest position it blocks the bypass line to the reservoir.

The regulating circuit according to FIG. 4 which is designed with the structural elements of FIGS. 4a, 4b and FIG. 3a, operates as follows: In the normal condition of the system and the pump turned on, the oil current in valve 1.1 is supplied by the main control piston 41, from port 44 to reservoir port 46. This supply is nearly pressureless so that check valve 43 is still closed. Pressure medium is simultaneously supplied to pilot line 48. Due to the throttling action of throttle 48.3 no pressure builds up in cylindrical chamber 41.1 since the pilot piston is open to the reservoir. In this manner a nearly pressureless circulation is insured in valve 1.1 In order to move user 4, check valve 43 must be opened, the closing force of this valve being determined by the pressure force of the pressure medium in the user line and by the spring force of spring 47.

The pump pressure necessary for the opening of check valve 43 is obtained by setting a desired-value. Since no actual-value is present, amplifier 5 furnishes an output signal so that electromagnet 6 moves the pilot piston 42 of valve 1.1 in closing direction as a result of which the flow to the reservoir is reduced. As a consequence, the pressure in cylinder space 41.1 rises so that differential piston 41 moves downwardly. The direct through-flow from the pump to the reservoir is likewise reduced in this manner.

In the course of the ensuing rise in pressure in valve 1.1 the closing pressure of check valve 43 is overcome so that the pressure medium can flow through flow meter 2.1 to user 4. This insures that the user cannot move down since the closing pressure of check valve 43 must first be overcome and since this pressure in turn depends on the magnitude of the loading force. Plate 12 of the flow meter is displaced whereby slider 15.1 glides over resistor 15 so that an actual-value signal is transmitted. Upon existence of a difference signal electromagnet 6 of valve 1.1 is controlled. In order to insure this, that is, in order not to control electromagnet 6 of valve 1, two diodes, 49 and 49.1, have been interposed between amplifier 5 and electromagnet 6. The circuit is designed so that for an outward movement of user 4 only positive signals are produced so that only electromagnet 6 of valve 1.1 can be controlled by way of diode 49. Valve 1 therefore always remains in its blocking position shown. If the user is to be arrested in its upward movement, a desired-value "0" is set. Since then a positive actual-value is still present, magnet 6 of valve 1.1 is controlled. This magnet opens, by means of pilot piston 42, the through-flow from pilot line 48 and cylinder space 41.1 to the reservoir. In this fashion, spring 47 can return piston 41 to its upper end position, the pressure in valve 1.1 collapses and the check valve closes.

For the downward movement of the user, pilot piston 52 of valve 1 must be actuated such that the pressure is removed from cylinder space 51.1. This is brought about by the setting of a negative desired-value so that—considering that the user is at rest and therefore no actual-value is present—electromagnet 6 of valve 1 is controlled by way of diode 49.1. This electromagnet moves pilot piston 52 downwardly against the closing force of spring 52.1. The closing force of spring 52.1 is designed so that for maximum load pressure it holds the pilot piston 52 safely and without leakage in its closing position.

Due to the opening of pilot piston 52 and because of the throttling action of throttle 59, the oil pressure can lift the differential piston 51 against the force of spring 57 so that user port 55 is connected with reservoir port 46.

Thus, the downward movement of the user may also be regulated by means of a corresponding desired-value program.

In FIG. 5 a different application of the regulating circuit according to the invention has been shown. Here a proportionally controllable 4/3 flow-control valve of conventional design is connected with flow meter 2.1 which is suitable for both operating directions of the user. This circuit lends itself especially for users which in one operating direction are always acted upon by an external load of whatever magnitude. Such machine are hoists, hydraulically operated shaping machines and cranes, for example. It stands to reason that the flow meter be interposed in that user line in which the external force must be supported.

If valve 60 is switched into position I, the pressure medium flows from the pump through flow meter 2.1 to user 4. Measuring element 12 of flow meter 2.1 (FIGS. 3a,b) is thereby displaced so that a positive actual-value signal is transmitted. If a difference is present with respect to the also positive desired-value signal, then this difference is compensated for in a correcting sense by way of diode 61 and the control of electromagnet 62.

For downward movement the reverse flow from the user is detected by flow meter 2.1 and, via desired-value sender 9.1—which in this case transmits negative desired values—diode 63 and electromagnet 64, is also regulated.

In FIG. 6 circuit an arrangement with a 4/3 flow-control valve is shown in which flow meter 2 (FIG. 1a) is interposed in the reservoir return line between valve 70 and the reservoir. This circuit arrangement may be used for all users regardless of whether or not an external load is effective during the operation of the user.

Since here only one flow direction, independently of the user motion direction, is effective in flow meter 2, only one measuring direction is required. Similarly, the transmitting range of desired-value sender 9 is limited to only a single indicating range (see FIG. 1, 1a). Since amplifier 5, however, in each case mut actuate only one magnet 7.1 or 7.2 for a given displacement direction, a mutual blocking of the electromagnets must be provided. Because of the single measuring range, this cannot be effected by means of diodes but must be brought about electrically by means of transfer switches or the like. This may, for example, be coupled with the actuation of the desired-value sender by the operating personnel. The regulating circuit operates here as shown in FIG. 1.

In FIG. 7 there is shown a regulating circuit with a 4/3, or strictly speaking 5/3, flow-control valve of conventional design, the details of which have been symbolically shown; a direction-selecting flow meter has also been illustrated. For this reason, the structure and operation of the flow meter will first be explained.

In FIG. 7a the flow meter 71 is shown in principle. It has two measuring elements, 73.1 and 73.2, which are fixedly mounted, at a mutual axial distance, on guide rod 74. Their design is identical to that of measuring element 12 (FIG. 1a). The guide rod is mounted for axial displacement. The axial distance of the control rims of the two measuring elements corresponds to the internal width of the radially disposed opening 72.3 which connects flow meter 71 with the reservoir. The cross section of reservoir outlet 72.3 may assume any desired form, depending on the desired characteristic of the flow meter.

The two radial inlet openings 72.1 and 72.2, are located to the right and left, respectively, adjacent measuring elements 73.1 and 73.2. It should be noted, however, that the minimum axial distance of each inlet opening from the outlet opening 72.3 is larger than the axial distance of the control rims of measuring elements 73.1 and 73.2 from each other.

Springs 75.1 and 75.2 bear on the one hand on orifice plates 76 which in turn bear on the housing, namely in order to insure that the bias of the springs does not drop below a minimum limit. On the other hand, the two springs respectively bear against the inner wall of the housing and against an intermediate wall which separates the measuring chamber with the actual-value sender 8.1 from the pressure medium chamber. The intermediate wall, however, permits pressure equalization.

The measuring system shown here operates analogously to that shown in FIG. 3a.

Guide rod 74 is freely movable in orifice plate 76, however, it has an abutment so that in case of a displacement the measuring element shoves the corresponding orifice plate ahead of itself. For example, if oil flows through connection 72.2 into flow meter 71, then measuring elements 73.1 and 73.2 are displaced with guide rod 74 to the left against the force of spring 75.2. Spring 75.1, due to its support, remains in the position shown in the drawing.

Due to the axial displacement of guide rod 74 a predetermined aperture cross section to outlet 72.3 is set up at the control rim of measuring element 73.2.

Through-flow meter 71 is connected to the two usually available reservoir outlets of valve 70 before these are combined to a single connection. Sine this is normally brought about in the valve housing, the flow meter 71 is particularly suited for mounting in this connection channel.

Thus, inasmuch as the two fluid connections 72.1 and 72.3 are axially joined—in the present instance with flow meter 71 interposed—in the valve housing, fluid connection 72.3 is, in this part of the hydraulic circuit, the only one which leaves the valve housing. From the foregoing, it will be understood that valve 70, FIG. 7, is indeed of the 4/3 type.

The following operating position is assumed: For outward movement of user 4 valve 70 is switched into position I. The reverse current from the user to the reservoir is extended by way of line 72.2 to flow meter 71 and it displaces measuring elements 73.1 and 73.2 to the left. Accordingly, the displacement measuring system transmits a positive signal. Upon the generation of a difference signal by amplifier 5, the electric signal is passed from diode 78 to the left-hand electromagnet which moves the valve in a correcting sense.

For an inward movement of the user an analogous operation takes place, that is, the oil flows via line 72.1 into flow meter 71, there displacing measuring element 73.1 and 73.2 to the right so that it can flow from outlet opening 72.3 to the reservoir. If the inward velocity departs from the one desired, a negative signal is present at the output of amplifier 5, this signal being passed by diode 77 to the right-hand electromagnet which operates the main control piston in a correcting sense.

I claim:

1. In a hydraulic system including a hydraulic drive unit for moving a load, said drive unit being connected to a hydraulic circuit through which hydraulic fluid flows from and back to a fluid reservoir via a pressure fluid supply means under the control of flow-control valve means having a main control plunger, an electrically operated means to position said main control plunger, a flow meter having a displaceable measuring element to sense the flow of said hydraulic fluid, an electric displacement measuring means connected to the flow meter so as to detect the displacement amplitude of said measuring element and to convert said amplitude of said measuring element into an electric actual-value signal proportional to the existing fluid flow, means for sending an adjustable electric desired-value signal, electric comparing means to compare an input of said actual-value signal with an input of said desired-value signal in order to provide an output difference signal and means connecting the output of said electric comparing means to said electrically operated positioning means in order to position the main control plunger of said flow-control valve means in response to the difference signal, the improvement for regulating and maintaining a substantially constant velocity of movement of said hydraulic drive unit, irrespective of disturbances including fluctuations in the pressure of the fluid supply, which comprises:

a flow meter arranged in said hydraulic circuit, said flow meter having a housing of constant inner diameter which encloses at least one pressure chamber around a longitudinal flow axis with radially disposed and axially displaced inlet ports and an outlet port to conduct the hydraulic fluid therethrough; and a measuring element of said flow meter having sensor means which are axially movable in said housing between said biased spring means such that said sensor means, in the rest position, cover a radially disposed outlet port while the inlet ports are disposed outside the range of movement of said sensor means on either side of said outlet port.

2. A hydraulic system as claimed in claim 1 wherein a measuring element of said flow meter is fixedly attached to a guide rod movable axially within said housing against the action of said biased spring means, and a potentiometer comprising a slider is arranged within said pressure chamber of said housing, said slider being mounted on said guide rod to act as a position sensor in producing said actual-value signal.

3. A hydraulic system as claimed in claim 2 wherein said measuring element is in the form of a plate attached to said guide rod and extending over the flow cross section of the interior of said housing, the circumferential rim of said plate cooperating with the inner cross section of the housing to produce an axial displacement of the plate in the direction of the outlet port and a variable flow of fluid around the plate and through said outlet port.

4. A hydraulic system as claimed in claim 3 wherein said flow meter housing has an axially constant inner cross section, and the fluid inlet and outlet ports of said housing are axially displaced with respect to each other and are axially situated within the range of motion of said measuring element.

5. A hydraulic system as claimed in claim 1 wherein said flow meter has two radial inlet ports and one radial outlet port and is interposed in said hydraulic circuit between said flow-control valve means and said fluid reservoir.

6. A hydraulic system as claimed in claim 1, wherein said hydraulic circuit has two legs connected to two separate ports, respectively, of said drive unit for driving said drive unit in opposite directions; and wherein said valve means is in the form of a single valve comprising two sets of opposing ports, one set consisting of two ports being connected to the two legs of said drive unit, respectively, and the other set consisting of three ports having one port connected to the feed line from said fluid supply means and the other two ports connected by individual feed lines to the two inlet ports of said flow meter, respectively, plunger means having two sets of conduits movable into a central position from two end positions, one on each side of said central position, for reversing the direction of flow of fluid to said drive unit and said flow meter by changing the interconnections of said conduits with the opposing valve ports of said two sets while closing one or the other of the two valve ports connected to the inlet ports of said flow meter, and two positioning members for positioning said plunger means back and forth in the direction of said two end positions, respectively.

7. A hydraulic system as claimed in claim 6, wherein said electric displacement measuring means and said electric desired-valve sending means are of bipolar design; and wherein diode means are interposed in the output connections of said comparing means to said two valve positioning members to electrically isolate said two members from each other.

* * * * *